(12) United States Patent
Kato et al.

(10) Patent No.: US 6,316,101 B2
(45) Date of Patent: *Nov. 13, 2001

(54) POLYESTER FIBER AND FABRICS MADE BY USING THE SAME

(75) Inventors: Jinichiro Kato; Katsuhiro Fujimoto; Tetsuko Takahashi, all of Nobeoka (JP)

(73) Assignee: Asahi Kasei Kogyo Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,581

(22) PCT Filed: Sep. 3, 1998

(86) PCT No.: PCT/JP98/03960

§ 371 Date: Feb. 14, 2000

§ 102(e) Date: Feb. 14, 2000

(87) PCT Pub. No.: WO99/11845

PCT Pub. Date: Mar. 11, 1999

(30) Foreign Application Priority Data

Sep. 3, 1997 (JP) .................................... 9-252686

(51) Int. Cl.[7] ................. D01F 6/92; D01F 6/00
(52) U.S. Cl. ............................. 428/364; 428/395
(58) Field of Search ................... 428/364, 395; 328/272

(56) References Cited

U.S. PATENT DOCUMENTS

| | | | |
|---|---|---|---|
| 3,907,754 | 9/1975 | Tershansy et al. | 260/75 R |
| 4,010,145 | 3/1977 | Russin et al. | 252/428 |
| 5,340,909 | 8/1994 | Doerr et al. | 528/276 |
| 5,989,665 | * 11/1999 | Connell et al. | 528/272 |
| 6,093,786 | * 7/2000 | Kelsey | 528/272 |

FOREIGN PATENT DOCUMENTS

| | | |
|---|---|---|
| 52-5320 | 1/1977 | (JP) . |
| 58-104216 | 6/1983 | (JP) . |
| 5-262862 | 10/1993 | (JP) . |
| 8-311177 | 11/1996 | (JP) . |
| 51-142098 | 12/1996 | (JP) . |
| 9-195142 | 7/1997 | (JP) . |
| 52-105591 | 9/1997 | (JP) . |
| WO 98/23662 | 6/1998 | (WO) . |

OTHER PUBLICATIONS

34th International Man–Made Fibers Congress–Fibers Made of Polytrimethylene Terephthalate—Sep. 20–22, 1995.
Synthesis and properties of fiber–grade poly(trimethylene terephthalate), H. L. Traub et al., Angewandte Makromolekulare Chemie, Applied Macromolecular Chemistry and Physics, vol. 230, Jan. 8, 1995, pp. 179–187.*
The Mechanical Properties and Structure of Poly(m–methylene Terephthalate) Fibers, I.M. Ward et al., Journal of Polymer Science: Polymer Physics Edition, vol. 14, 1976, pp. 263–274.*
Schauhoff et al., "New developments in the production of polytrimethylene terepthalate (PTT)," IEEE Chemical Fiber International, vol. 46, pp. 263–264, (1996).

* cited by examiner

Primary Examiner—Newton Edwards
(74) Attorney, Agent, or Firm—Finnegan, Henderson, Farabow, Garrett & Dunner, L.L.P.

(57) ABSTRACT

There are disclosed polyester fibers that are composed of at least 90% by weight of poly(trimethylene terephthalate) and have a limiting viscosity of 0.4–2, being characterized by containing a phosphorus compound at 10–250 ppm in terms of weight of elemental phosphorus, containing no more than 3 wt % of cyclic dimers, containing no more than 2 wt % of bis(3-hydroxypropyl) ether copolymerized with the poly (trimethylene terephthalate), and having a birefringence of 0.03 or greater.

The polyester fibers are poly(trimethylene terephthalate)-based fibers with excellent whiteness and tenacity, which are obtained by melt spinning of poly(trimethylene terephthalate) resin composition with improved whiteness, melt stability and spinning stability. The polyester fibers of the invention have satisfactory processability and can be mixed with stretch fibers and the like to provide fabrics having functions that cannot be obtained with commonly used polyester fibers and nylon fibers, for various types of clothing products and the like.

9 Claims, No Drawings

POLYESTER FIBER AND FABRICS MADE BY USING THE SAME

TECHNICAL FIELD

The present invention relates to polyester fibers that have excellent whiteness and stability and readily exhibit high tenacity and to fabrics using them, and more specifically it relates to polyester fibers with excellent whiteness and tenacity that are produced using a poly(trimethylene terephthalate) resin with excellent whiteness, spinning stability and vastly minimized molecular weight reduction when molten, and to fabrics using them.

BACKGROUND ART

Poly(trimethylene terephthalate) fibers are revolutionary fibers that have both properties similar to nylon fibers, such as a soft touch, excellent elastic recovery and ready dyeability because of their low elastic modulus, and properties similar to poly(ethylene terephthalate) fibers such as wash-and-wear properties, dimensional stability and yellowing resistance; these characteristics are increasingly being used in applications such as clothing, carpets and the like.

Poly(trimethylene terephthalate) can be polymerized by the same process as poly(ethylene terephthalate) and poly (butylene terephthalate) which have a related chemical structure. That is, first terephthalic acid or a lower alcohol diester of terephthalic acid such as dimethyl terephthalate and trimethylene glycol (also referred to as 1,3-propanediol) may be subjected to the ester exchange reaction represented by chemical equation (1) while heating either without a catalyst or in the presence of a catalyst such as metal carboxylic acid salt, a titanium alkoxide or an organic acid, and then subjected to the polycondensation reaction represented by chemical equation (2) under reduced pressure using a catalyst such as a titanium alkoxide or an antimony oxide.

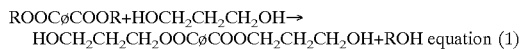

equation (1)

(R: —H or —CH$_3$, ø: benzene ring with para-bonding)

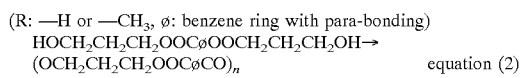

equation (2)

However, polymerization of poly(trimethylene terephthalate) is associated with a number of technical difficulties unlike poly(ethylene terephthalate) and poly (butylene terephthalate), and these problems have not yet been surmounted. Specifically, these technical problems may be largely classified into the three problems of whiteness, spinning stability and melt stability.

The problem of whiteness arises because yellow discoloration of the polymer during the polymerization stage results in discoloration of the fibers or fabric as well, thus impairing the product performance. The soft touch, excellent elastic recovery and easy care properties of poly (trimethylene terephthalate) fibers are expected to be advantageously used particularly in the fields of inner wear, panty stockings, sportswear, outer wear, etc. For commercial product development in these fields it is necessary for the fibers to have sufficiently high whiteness, so that they can be aesthetically colored with different light or dark colors. However, poly(trimethylene terephthalate) tends to undergo discoloration during the polymerization stage, and when colored polymers with poor whiteness are used for production of fibers and fabrics, the discoloration of dyed fiber products loses its clarity and the product value is notably diminished.

The problem of spinning stability arises because the abundant impurities in the polymer adversely affect the spinning stability. Specifically, the large amount of cyclic dimers as well as cyclic and linear oligomers that are present in the polymerization process for poly(trimethylene terephthalate) precipitate around the spinneret during spinning, and this creates the problem of more yarn breakage requiring a higher spinneret cleaning frequency (called the wiping period). The amount of cyclic dimers is especially high and constitutes the major cause of this problem.

The problem of melt stability occurs because the molten polymer lacks thermal stability, resulting in molecular weight reduction or discoloration of the polymer. The tendency toward molecular weight reduction means, particularly, that even if the molecular weight is increased at the polymer stage, the molecular weight will be reduced at the melt spinning stage. When this phenomenon occurs it becomes difficult to increase the tenacity of the fibers, and this has an adverse effect on the basic performance of the commercial product by lowering the tear strength and strength at break of the fabric product.

Although complete resolution of these three technical problems would give poly(trimethylene terephthalate) fibers with excellent whiteness, suitability for industrial production and sufficient tenacity, the prior art includes no knowledge of poly(trimethylene terephthalate) and fibers using it that satisfy all of these conditions.

Several publicly known techniques are known as methods for improving the whiteness and spinnability of poly (trimethylene terephthalate).

For example, in Japanese Unexamined Patent Publication (Kokai) No. 5-262862 there is disclosed a technique using a tin catalyst as a polymerization catalyst for improved whiteness. Upon investigation by the present inventors, however, the use of a tin catalyst results in a very high polymerization speed but the whiteness is instead inferior to using titanium alkoxides as catalysts. Zinc acetate has also been used as an ester exchange catalyst and tin catalysts have been used as polycondensation catalysts, but when such combinations are used for simple melt polymerization without solid state polymerization, the amount of cyclic dimers exceeds 3 wt %, which is unfavorable for the spinning stability. In the examples found therein, tridecyl phosphate is included at up to 500 ppm during the polymerization. Inclusion of such a long-chain compound presents disadvantages such as efflux of foam during the dyeing stage and a tendency to form dyeing spots. Furthermore, the use of tin catalysts and tridecyl phosphate has resulted in lower tenacity of the obtained fibers, making it difficult to exhibit tenacity of 3.5 g/d or greater.

An alternative has been proposed to the use of titanium catalysts as ester exchange reaction catalysts and antimony catalysts as polycondensation catalysts, for improved whiteness (Chemical Fiber International, Vol.45, pp.263–264, 1996). This document also touches on generation of by-products, indicating that poly(trimethylene terephthalate) can sometimes contain over 3% oligomers, which impurities become a problem in the spinning step and dyeing step. According to investigation by the present inventors, however, the use of antimony catalysts result in a lower polymerization speed, thus lengthening the time during which the polymer is exposed to high temperature and producing instead reduced whiteness. Furthermore, no concrete suggestion is provided in regard to reducing the oligomer content and improving the polymer melt stability in this process.

Japanese Unexamined Patent Publication (Kokai) No. 8-311177 teaches that poly(trimethylene terephthalate) with a limiting viscosity of 0.9 or greater, a b value (index for judging yellowing of the tip) of no greater than 10 and an oligomer content of no greater than 1 wt % can be obtained by subjecting poly(trimethylene terephthalate) obtained by a common method to solid state polymerization at 190–200° C., for the purpose of reducing white powder produced at and around the spinning nozzle surface during the spinning step and to minimize yarn breakage. According to the examples in this publication, terephthalic acid and 1,3-propanediol are subjected to solventless ester exchange without using phosphorus compounds or cobalt compounds, and then tetrabutyl titanate (titanium butoxide) is added to prepare a prepolymer with a limiting viscosity of 0.70, after which solid state polymerization is carried out to obtain a polymer with a limiting viscosity of 1.02. When such polymers are melted, however, they undergo sudden thermal decomposition, lowering the molecular weight. Thus, highly polymerized polymers obtained by this process cannot give fibers with sufficient tenacity because of the viscosity reduction that occurs during the spinning stage.

In International Patent Application No. (WO)9823662 there is disclosed poly(trimethylene terephthalate) that is terminally masked with a hindered phenol portion to reduce the amount of acrolein produced upon heating in air, and a process for its production. In this known case, terephthalic acid, trimethylene glycol and an ester-forming monofunctional dicarboxylic acid with a hindered phenol portion are subjected to ester exchange reaction at high pressure in the presence of a triphenyl phosphate-based stabilizer, after which polycondensation reaction is carried out to obtain a polymer. However, the triphenyl phosphate-based stabilizer used here partially sublimates during the polycondensation reaction process which is carried out at high temperature in a vacuum, such that the elemental phosphorus content of the resulting polymer is significantly reduced. The polymer therefore has low melt stability, making it difficult to obtain high tenacity fibers. This publication also offers no suggestion regarding the issue of polymer melt stability conferring tenacity to the fibers. While the publication teaches that bis(3-hydroxypropyl)ether is contained in the polymer at about 4 mole percent (exceeding 2 wt %), such a polymer has considerably low heat resistance and light fastness and therefore cannot be used for production of clothing fibers. In addition, since this publication concerns a technique of conducting ester exchange reaction under high pressure, for industrial applications it requires large equipment that can withstand high pressure, and therefore the technique has an economic drawback.

Japanese Unexamined Patent Publication (Kokai) No. 9-195142 discloses fibers using poly(trimethylene terephthalate) with a limiting viscosity of 0.92, obtained by ester exchange reaction of terephthalic acid and 1,3-propanediol followed by polycondensation at 250° C., and the examples include one where fibers with a tenacity of 5.2 g/d and an elongation of 41% are used as core filaments of multicomponent fibers. However, it is difficult to use this publicly known technique to overcome the problems of polymer whiteness and poor melt stability, for stable industrial production of fibers with a practical level of strength. This is because even when fibers having such tenacity are obtained, the low polycondensation temperature of 250° C. means that the polymer will contain over 3 wt % of cyclic dimers, so that fluff and yarn breakage becomes more frequent and the resulting filaments have low uniformity.

DISCLOSURE OF THE INVENTION

It is an object of the present invention to provide poly (trimethylene terephthalate) fibers with high whiteness and excellent strength.

It is another object of the invention to provide polyester fibers with excellent whiteness and tenacity which employ poly(trimethylene terephthalate) with excellent spinning stability. It is yet another object of the invention to provide poly(trimethylene terephthalate) fibers with excellent tenacity that can be clearly dyed.

The present inventors have carried out much research aimed at achieving a production process for poly (trimethylene terephthalate) that has excellent inherent whiteness, undergoes little discoloration in the melt spinning stage and readily gives high-strength fibers and, as a result, have attained the aforementioned object of the invention by optimizing the polymerization conditions in the presence of a phosphorus compound to successfully reduce the amount of impurities that have an undesirable effect on whiteness, spinning stability and melt stability, and by examining in detail the conditions of the fiber production process, such as melt spinning, for polymers obtained in such a fashion.

In other words, the present invention relates to polyester fibers with an intrinsic viscosity of 0.4–2 that satisfy the following conditions (1) to (5).

(1) being composed of at least 90% by weight of poly (trimethylene terephthalate), (2) containing a phosphorus compound at 10–250 ppm in terms of weight of elemental phosphorus, (3) containing no more than 3 wt % of cyclic dimers, (4) containing no more than 2 wt % of bis(3-hydroxypropyl) ether copolymerized with poly(trimethylene terephthalate), and (5) having a birefringence of 0.03 or greater.

The polyester fibers of the invention are polyester fibers composed of at least 90% by weight of poly(trimethylene terephthalate) with respect to the fiber weight.

Here, poly(trimethylene terephthalate) is a polyester comprising terephthalic acid as the acid component and trimethylene glycol (also referred to as 1,3-propanediol) as the diol component. The poly(trimethylene terephthalate) may also contain other copolymerized components at no greater than 10% by weight with respect to the fiber weight. As such copolymerized components there may be mentioned such ester-forming monomers as 5-sodium sulfoisophthalic acid, 5-potassium sulfoisophthalic acid, 4-sodium sulfo-2,6-naphthalenedicarboxylic acid, tetramethylphosphonium 3,5-dicarboxylate benzenesulfonate, tetrabutylphosphonium 3,5-dicarboxylate benzenesulfonate, tetrabutylmethylphosphonium 3,5-dicarboxylate benzenesulfonate, tetrabutylphosphonium 2,6-dicarboxylate naphthalene-4-sulfonate, tetramethylphosphonium 2,6-dicarboxylate naphthalene-4-sulfonate, ammonium 3,5-dicarboxylate benzenesulfonate, 1,2-butanediol, 1,3-butanediol, 1,4-butanediol, neopentylglycol, 1,5-pentamethyleneglycol, 1,6-hexamethyleneglycol, heptamethyleneglycol, octamethyleneglycol, decamethyleneglycol, dodecamethyleneglycol, 1,4-cyclohexanediol, 1,3-cyclohexanediol, 1,2-cyclohexanediol, 1,4-cyclohexanedimethanol, 1,3-cyclohexanedimethanol, 1,2-cyclohexanedimethanol, oxalic acid, malonic acid, succinic acid, glutaric acid, adipic acid, heptanedioic acid, octanedioic acid, sebacic acid, dodecanedioic acid, 2-methylglutaric acid, 2-methyladipic acid, fumaric acid, maleic acid, itaconic acid, 1,4-cyclohexanedicarboxylic acid, 1,3-cyclohexanedicarboxylic acid, 1,2-cyclohexanedicarboxylic acid, etc.

The intrinsic viscosity [η] (also referred to as the intrinsic viscosity number) of the polyester fibers of the invention must be 0.4–2.0. If the intrinsic viscosity is less than 0.4 the polymerization degree of the polymer becomes too low, thus reducing the tenacity of the resulting fibers and resulting in unstable spinnability. Conversely, if the limiting viscosity exceeds 2.0 the melt viscosity will be too great, making it impossible to achieve smooth measurement with a gear pump and resulting in reduced spinnability due to poor discharge, etc. The limiting viscosity is more preferably 0.6–1.5, and especially 0.6–1.4.

The polyester fibers of the invention must include a phosphorus compound at 10–250 ppm in terms of weight of elemental phosphorus. From polymerization until completion of a clothing product, the monomer will undergo steps including melt polymerization, solid state polymerization, high-temperature chip drying, melt spinning, scouring, heat setting, dyeing, etc., and the phosphorus compound will exhibit a very significant effect toward preventing discoloration and improving the melt stability during each of these steps.

The phosphorus compound will now be explained in further detail.

Poly(trimethylene terephthalate), unlike poly(ethylene terephthalate) and poly(butylene terephthalate) which are widely used for clothing, is particularly susceptible to yellow discoloration during melt polymerization, drying and melt spinning. The phosphorus compound is especially effective for minimizing such yellowing.

Also, because of the low melt stability of poly(trimethylene terephthalate), a drawback is presented in that the polymerization degree tends to be lowered during spinning, and thus even if a high limiting viscosity starting polymer and resin composition (hereunder referred to a simply as "starting material") is used for the spinning, the polymerization degree reduction results in fibers with limited tenacity. The phosphorus compound exhibits a major inhibiting effect on this viscosity reduction.

The phosphorus compound is preferably an organic phosphorus compound, and phosphorus compounds with particularly excellent effects of prevention from discoloration and melt stability which do not adversely affect the spinnability include phosphates represented by $O=P(OR_1)(OR_2)(OR_3)$ and phosphites represented by $P(OR_4)(OR_5)(OR_6)$. Here, $R_1, R_2, R_3, R_4, R_5$ and $R_6$ may be the same or different, and are preferably selected from among hydrogen atoms or organic groups of 1–8 carbon atoms, alkali metals and alkaline earth metals. When $R_1, R_2, R_3, R_4, R_5$ and $R_6$ are organic groups of 9 or more carbon atoms, a disadvantage is presented by efflux of foam at the dyeing stage, tending to result in dyeing spots and hampering tenacity increase. One of the alkoxy groups among $R_1, R_2, R_3, R_4, R_5$ and $R_6$ in the phosphorus compound is preferably a hydrogen atom or an alkyl group of 1–8 carbon atoms. This is because alkoxy groups undergo ester exchange with trimethylene glycol, creating a form that is easily dispersible in the polymer. Such phosphorus compounds dispersed on the molecular order exhibit an especially notable effect of preventing discoloration and improving the melt stability. In contrast, when all of $R_1, R_2, R_3, R_4, R_5$ and $R_6$ are phenoxy groups or groups wherein all or a portion of the hydrogen groups on the benzene ring are substituted, these do not easily undergo ester exchange with trimethylene glycol and therefore the dispersion is more difficult on the molecular order, or because of their sublimation properties they volatilize out of the system tending to result in a reduced effect of discoloration prevention and melt stability improvement. Consequently, it is preferred for at least one of the alkoxy groups of the phosphorus compound to be a hydrogen atom or an alkyl group of 1–8 carbon atoms, an alkali metal or an alkaline earth metal. Since phosphites represented by $P(OR_4)(OR_5)(OR_6)$ tend to slightly inhibit polymerization when used as the phosphorus compounds, it is particularly preferred to use phosphates represented by $O=P(OR_1)(OR_2)(OR_3)$.

As specific examples of preferred phosphorus compounds there may be mentioned phosphoric acid, trimethylphosphate, triethylphosphate, tripropylphosphate, tributylphosphate, tripentylphosphate, trihexylphosphate, triheptylphosphate, trioctylphosphate, dimethylethylphosphate, dimethylphosphate, methylphosphate, 3-hydroxypropylphosphate, bis(3-hydroxypropyl)phosphate, tris(3-hydroxypropyl)phosphate, triphenylphosphate, phosphorous acid, trimethylphosphite, triethylphosphite, tripropylphosphite, tributylphosphite, tripentylphosphite, trihexylphosphite, triheptylphosphite, trioctylphosphite, dimethylethylphosphite, dimethylphosphite, methylphosphite, 3-hydroxypropylphosphite, bis(3-hydroxypropyl)phosphite, tris(3-hydroxypropyl)phosphite, triphenylphosphite, sodium phosphate, potassium phosphate, magnesium phosphate, calcium phosphate, sodium dimethyl phosphate, disodium methyl phosphate, etc., and particularly preferred are phosphoric acid, trimethyl phosphate, triethyl phosphate and tripropyl phosphate from the standpoint of an excellent effect of preventing discoloration and improving melt stability, as well as low inhibition of polymerization.

The amount of the phosphorus compound in the fibers can be represented by the weight proportion of the elemental phosphorus contained in the fibers, and the range must be 10–250 ppm. At less than 10 ppm the effect of preventing discoloration and inhibiting viscosity reduction is not adequately exhibited, and at greater than 250 ppm these effects are adequately obtained, but the polymerization catalyst is partially inactivated so that melt polymerization and solid state polymerization are impeded. A preferred elemental phosphorus weight proportion is 35–150 ppm, and especially preferred is 5–120 ppm.

Incidentally, for the polymerization of the poly(trimethylene terephthalate), as will be explained in detail below, there is employed a metal catalyst, for example a titanium alkoxide such as titanium butoxide or titanium isopropoxide, or antimony trioxide. The type of metal element in the metal compound used as the polycondensation catalyst is titanium, tin or antimony because of their high activity. The phosphorus compound sometimes reacts with these polycondensation catalysts, thus slightly lengthening the polymerization time. In order to prevent lengthening of the polymerization time and prevent discoloration while improving the melt stability, the proportion of the number of moles of the elemental phosphorus in the phosphorus compound with respect to the number of moles of the metal element used as the polycondensation catalyst is preferably adjusted to 0.4–3, and especially 0.55–2.

In the polyester fibers of the invention it is particularly preferred to use a cobalt compound in combination with the phosphorus compound, since such combined use provides a synergistic effect which notably reduces the discoloration during melt polymerization, drying and melt spinning. As cobalt compounds there may be mentioned cobalt acetate, cobalt formate, cobalt carbonate, cobalt acetylacetonate, cobalt sulfate, cobalt chloride, cobalt bromide, cobalt hydroxide, cobalt nitrate, cobalt carbonate, etc., which may be in anhydride or hydrated form. Particularly preferred among these cobalt compounds are cobalt acetate, cobalt formate, cobalt carbonate, cobalt acetylacetonate and cobalt sulfate, from the standpoint of a more excellent effect against discoloration.

The amount of the cobalt compound contained in the polyester fibers of the invention can be represented by the weight proportion of the cobalt element contained in the fibers, and the range is preferably 5–200 ppm. At less than 5 ppm the effect of preventing discoloration is not adequately exhibited, and at greater than 200 ppm the polymer undergoes blue tinged discoloration or exhibits black tinged discoloration. The range is preferably 10–150 ppm, and especially 10–100 ppm.

The amount of cyclic dimers contained in the polyester fibers of the invention must be no greater than 3% by weight with respect to the weight of the fibers. Here, cyclic dimers are dimers where trimethylene terephthalate units are connected in ringed form. When cyclic dimers are present in the starting material at greater than 3% by weight, they precipitate around the spinneret, on the oiling nozzle and on the guide during spinning, thus shortening the wiping period and in worst cases producing fluff and yarn breakage. For stable spinning for long periods of 2 weeks or more, the cyclic dimers are preferably limited to no greater than 2% by weight, and more preferably no greater than 1% by weight.

The bis(3-hydroxypropyl)ether (HOCH$_2$CH$_2$CH$_2$OCH$_2$CH$_2$CH$_2$OH:, hereunder abbreviated to BPE) contained in the polyester fibers of the invention must be present at no greater than 2% by weight with respect to the weight of the fibers. BPE is produced in the polymerization process by dimerization of trimethylene glycol as shown in the following chemical equation, and is copolymerized directly in the poly(trimethylene terephthalate). The amount of BPE produced depends on the amount of polymerization catalyst, the additives, the polymerization temperature, the polymerization time and the amount of trimethylene glycol.

2 HOCH$_2$CH$_2$CH$_2$OH→HOCH$_2$CH$_2$CH$_2$OCH$_2$CH$_2$CH$_2$OH

Because the copolymerized BPE has ether units, it lowers the thermal stability and light fastness of the fibers. If the amount of BPE exceeds 2% by weight, the melt stability of the starting material is notably reduced, resulting in discoloration of the fibers and a tendency for lower tenacity of the fibers.

However, BPE does not only have an adverse effect on the fibers, as it has been found that an increased amount of BPE improves the dyeability of the resulting fibers for disperse dyes. In particular, when the amount of BPE is in the range of 0.5–1% by weight, the fibers exhibit dyeability under atmospheric pressure without any large reduction in melt stability or light fastness. The fact that the fibers are dyeable under atmospheric pressure means that their composite fabrics which are mixtures with other fibers that undergo deterioration when dyed at temperatures of, for example, 100° C. or higher, such as polyurethane fibers, wool, silk and acetate fibers, can also be dyed at atmospheric pressure; this expands the range of possible uses of the poly(trimethylene terephthalate) fibers. This effect is more notable when the dye concentration is about 4% owf or less. This suggests that the BPE is preferably contained in the polyester fibers of the invention at no greater than 1% by weight, and more preferably 0.4–1% by weight.

If necessary, various additives such as delustering agents, heat stabilizers, antifoaming agents, color adjusters, flame retardants, antioxidants, ultraviolet absorbing agents, infrared absorbing agents, crystal nucleating agents, whitening agents, etc. may be copolymerized or mixed with the polyester fibers of the invention.

In particular, it is also preferred to add a hindered phenol-based antioxidant in order to minimize viscosity reduction during melt spinning of polyester fibers of the invention, and to inhibit low molecular weight by-products produced by thermal decomposition of acrolein or allyl alcohol which bear strong irritating odors. Any known hindered phenol-based antioxidant may be used, and examples thereof include pentaerythritol-tetrakis[3-(3,5-di-tert-butyl-4-hydroxyphenyl)propionate], 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 3,9-bis{2-[3-(3-tert-butyl-4-hydroxy-5-methylphenyl)propionyloxy]-1,1-dimethylethyl}-2,4,8,10-tetraoxaspiro[5,5]undecane, 1,3,5-tris(4-tert-butyl-3-hydroxy-2,6-dimethylbenzene) isophthalic acid, triethylglycol-bis[3-(3-tert-butyl-5-methyl-4-hydroxyphenyl)propionate], 1,6-hexanediol-bis[3-(3,5-di-tert-butyl- 4-hydroxyphenyl)propionate], 2,2-thio-diethylene-bis[3-(3,5-di-tert-butyl-4-hydroxyphenyl) propionate] and octadecyl-3-(3,5-di-tert-butyl-4-hydroxyphenyl)propionate]. Preferred among these is pentaerythritol-tetrakis[3-(3,5-di-tert-butyl-4-hydroxyphenyl)propionate]. In this case, the hindered phenol-based antioxidant may be bonded directly to the poly(trimethylene terephthalate), or simply dispersed in the fibers. The amount of the hindered phenol-based antioxidant added is preferably no more than 1% by weight, with respect to the weight of the fibers. If the amount exceeds 1% by weight, discoloration may occur, while its ability to improve the melt stability also becomes saturated when added at greater than 1% by weight. The amount of the hindered phenol-based antioxidant is preferably 0.02–0.5 wt %.

Whitening agents may also be used for improved whiteness, such as Eastbright by Eastman Co., and Hostaperm dyes described in Japanese Unexamined Patent Publication (Kokai) No. 5-262862. The amount of whitening agent used is preferably no more than 0.5% by weight with respect to the weight of the fibers, from the standpoint of the whitening effect and colorability of the dyed product.

Although no particular restrictions are placed on the method of producing the starting materials used for the invention, the preferred methods may be largely classified into the following two.

The first method employs a lower alcohol diester of terephthalic acid, such as dimethyl terephthalate, and trimethylene glycol.

Specifically, a lower alcohol diester of terephthalic acid, such as dimethyl terephthalate, is reacted with trimethylene glycol at a temperature of 200–240° C. for ester exchange, and then polycondensation reaction is conducted at no greater than 1 Torr and preferably under a reduced pressure of no greater than 0.5 Torr, and at a temperature of 250–290° C. and preferably 260–280° C., to obtain the target polymer. The polycondensation reaction temperature is especially important, as a high temperature will increase the reaction rate but promote discoloration. Conversely, when polymerization is conducted at a temperature of lower than 260° C. the cyclic dimer content increases. It is therefore preferred to select the reaction temperature for a good balance between the reaction rate and the cyclic dimer content. The preferred polycondensation temperature range is 260–280° C.

The molar ratio of the lower alcohol diester of terephthalic acid and the trimethylene glycol ester exchange catalyst for loading is 1:1.3–1:4, and preferably 1:1.5–1:2.5. If the trimethylene glycol is less than 1:1.3, the reaction time will be significantly lengthened, thus coloring the starting material. If the amount of trimethylene glycol is greater than 1:4, the BPE production will be greater than 2% by weight.

It is absolutely essential to use an ester exchange catalyst, and as preferred examples there may be mentioned calcium acetate, magnesium acetate, zinc acetate and titanium acetate. The ester exchange catalyst is preferably added in an amount of 0.02–0.1% by weight with respect to the terephthalic acid diester used. Manganese acetate also functions as an ester exchange catalyst, but because it results in a cyclic dimer content of over 3% by weight, the use of manganese acetate should be avoided, unless solid state polymerization is being conducted, in order to reduce the production of cyclic dimers, as explained below.

It is also absolutely essential to use a polycondensation catalyst, and as examples there may be mentioned titanium alkoxides represented by titanium tetrabutoxide and titanium tetraisopropoxide, and antimony acetate, antimony trioxide, etc.; however, titanium tetrabutoxide is particularly preferred for a faster reaction rate and lower amount of cyclic dimers. The polycondensation catalyst is preferably added in an amount of 0.03–0.1% by weight with respect to the terephthalic acid diester used.

According to the first method, the limiting viscosity of the starting material may be anywhere from about 0.4 to 0.8. The cyclic dimer content is usually 2–3% by weight, and the amount of BPE is no greater than 0.2% by weight.

The second method employs terephthalic acid and trimethylene glycol.

Specifically, terephthalic acid is reacted with trimethylene glycol at a temperature of 200–240° C. for ester exchange, and then polycondensation reaction is conducted at no greater than 1 Torr and preferably under reduced pressure of no greater than 0.5 Torr, and at a temperature of 250–290° C. and preferably 260–280° C., for the same reasons as in the first method, to obtain the target starting material. Here, in order to promote a smoother ester exchange reaction it is preferred to add 5–50% by weight of the ester exchange reaction product bis(3-hydroxypropyl) terephthalate at the reaction initiation stage as a method by which the reaction can be conducted in a more consistent manner, since this will increase the reaction rate.

The molar ratio of the terephthalic acid and the trimethylene glycol ester exchange catalyst for loading is 1:1.3–1:4, and preferably 1:1.5–1:2.1. If the trimethylene glycol is less than 1:1.3, the reaction time will be significantly lengthened, thus coloring the starting material. If the amount of trimethylene glycol is greater than 1:4, the BPE production will be greater than 2% by weight.

According to the second method, a proton dissociating from terephthalic acid acts as the ester exchange catalyst so that an ester exchange catalyst is not absolutely essential, but one is preferably used to further increase the reaction rate. As preferred examples there may be mentioned titanium alkoxides represented by titanium tetrabutoxide and titanium tetraisopropoxide. The amount of ester exchange catalyst is preferably 0.02–0.1% by weight with respect to the terephthalic acid used.

It is absolutely essential to use a polycondensation catalyst, and as examples there may be mentioned titanium alkoxides represented by titanium tetrabutoxide and titanium tetraisopropoxide, and antimony acetate, antimony trioxide, etc.; however, titanium tetrabutoxide is particularly preferred for a faster reaction rate and lower cyclic dimer content. The polycondensation catalyst is preferably used in an amount of 0.03–0.1% by weight with respect to the terephthalic acid used.

The intrinsic viscosity of the starting material obtained by this second method may be anywhere from about 0.4 to 0.8. The amount of cyclic dimers is usually 2–3% by weight, and the amount of BPE is 0.5–1.0% by weight. Thus, terephthalic acid may be used as the starting material for increased dyeability of the resulting fibers.

Incidentally, in either of the two methods described above, the phosphorus compound or the cobalt compound, and the hindered phenol-based antioxidant or whitening agent, etc. used for the invention may be added at any stage of the polymerization, either all at once or in stages, but the phosphorus compound is preferably added after completion of the ester exchange reaction to minimize discoloration without impeding the ester exchange reaction. When the temperature of the contents during polymerization is higher than the boiling point of the phosphorus compound used, direct addition of the latter will result in vaporization making it impossible to add the prescribed amount. In such cases, a particularly preferred method is to first dissolve it in trimethylene glycol at a temperature of at least 50° C. to react it with the trimethylene glycol and increase the boiling point, prior to its addition. Using this method will allow the prescribed amount of elemental phosphorus to be added to the starting material. A cobalt compound is preferably added prior to the ester exchange reaction since it can also function as an ester exchange catalyst.

The starting material obtained by either of the two methods explained above is essential in the production of polyester fibers according to the invention, but with these methods it becomes difficult to increase the limiting viscosity of the obtained starting material and fibers to 0.81 or greater. For example, if the reaction temperature is increased to raise the limiting viscosity, thermal decomposition sometimes occurs which prevents a further increase in the viscosity.

Solid state polymerization is a preferred method for achieving a limiting viscosity of 0.81 or greater. With solid state polymerization it becomes possible to increase the limiting viscosity even up to 2.0. Solid state polymerization can be accomplished using the starting material in the form of chips, powder, fibers, sheets or blocks, in the presence of an inert gas such as nitrogen or argon, or under reduced pressure of no greater than 100 Torr and preferably no greater than 10 Torr, and at 170–220° C., for about 3–48 hours. An advantage of solid state polymerization is that the limiting viscosity can be increased, while the cyclic dimers escape from the starting material during solid state polymerization because of the sublimating property of cyclic dimers, so that the cyclic dimer content in the resin composition can be limited to 2% by weight, and preferably to 1% by weight. It is thereby possible to reduce the cyclic dimer content to under 3% by weight after solid state polymerization even if the resin composition has a cyclic dimer content exceeding 3% by weight prior to solid state polymerization.

Thus, by combining melt polymerization and solid state polymerization it becomes possible to produce a starting material which is optimally suited for production of polyester fibers according to the invention.

The polyester fibers of the invention may be in the form of continuous filament or short fibers and, in the case of continuous filaments, they may be either multifilaments or monofilaments. At least a portion of the fibers of the invention may also be used to construct a nonwoven fabric. As examples of nonwoven fabric production methods there may be mentioned the spunbond method, spunlace method, melt-blowing method, flash spinning method, etc. There are no particular restrictions on the structure of the fibers, and all structures used for common synthetic fibers are included, such as undrawn yarn obtained by a common method, drawn yarn obtained by a common method, spin-draw process, high-speed spinning, etc., partially oriented yarn ("POY") used in false twisting processes, and different types of worked yarn. There are also no particular restrictions on the total denier, although 5–1000 d is preferred, and 5–200 d is especially preferred for clothing applications. The single filament denier is not particularly restricted either, but is preferably 0.0001–10 d. The cross-sectional shape is not particularly restricted and may be round, trilobal, flat, star-shaped, w-shaped, etc., and either solid or hollow.

The birefringence of the polyester fibers of the invention must be at least 0.03. The birefringence is a parameter indicating the orientation of the polymer chains of the fibers in the fiber axis direction. It was found that when the birefringence is less than 0.03 the orientation of the polymer chains of the resulting fibers is inadequate with the polymer chains existing in an easily mobile state, so that the properties of the fibers change over time even if kept at near room temperature. Since the fibers in this state permitting easy structural alteration will exhibit changes in dyeability and fabric properties even when stored as fabrics, their fabrics tend to produce uneven dyeing and uneven physical properties. In order to eliminate such changes in the fiber structure, the birefringence of the fibers is preferably 0.05 or greater, and more preferably 0.06–0.20. Fibers with a fiber birefringence of 0.03–0.06 can be false twisted by applying twist force while drawing to provide texturized yarn with bulky properties and stretch properties.

The mechanical properties of the polyester fibers of the invention will now be explained.

For example, when the polyester fibers of the invention are in the form of drawn yarn, the tenacity will differ depending on the intrinsic viscosity and the draw ratio, but is usually 3.5 g/d or greater. The major feature of the present invention in terms of the tenacity is that the melt stability of the starting polymer is sufficiently increased so that molecular weight reduction is inhibited at the melting stage even if the intrinsic viscosity is raised, thus allowing the fibers to exhibit high tenacity. With the polyester fibers of the invention, therefore, it is possible to exhibit tenacity of 4 g/d or greater with a limiting viscosity of about 0.7, and a tenacity of 5 g/d or greater, and sometimes even 6 g/d, with a intrinsic viscosity of 1 or higher. The elongation of the fibers in such cases is about 25–50%.

The elastic modulus is a major feature of the polyester fibers of the invention, and a very small value of about 20–30 g/d is exhibited. The small elastic modulus of the fibers is responsible for the very soft touch of its fabric products. The very excellent elastic recovery is also a major feature of the polyester fibers of the invention. Even when the polyester fibers of the invention are elongated to about 15%, the fibers are restored to approximately 100% of their original length, and even when elongated to 20%, the elastic recovery is over 80%. Thus, when the polyester fibers of the invention are made into a fabric it is possible to provide a fabric with a soft touch and satisfactory stretch properties, while maintaining suitable tenacity.

A process for production of polyester fibers according to the invention will now be explained using drawn yarn as an example.

The polyester fibers of the invention may be produced by using an extruder or the like to melt the starting materials which have been at least dried to a moisture content of 100 ppm and preferably no greater than 50 ppm, and then extruding the melted starting material through a spinneret, winding it up and then drawing it. The drawing carried out after winding may be the conventional process whereby the yarn which has been spun and then wound up on a bobbin or the like is drawn using a separate apparatus, or the spin-draw process in which the spinning and drawing steps are combined, where the resin composition that has been extruded from a spinneret is completely cooled to be solidified and then wound at least a few times on a first roll rotating at a fixed speed, so that absolutely no tension is transferred before or after the roll, and drawing is carried out between the first roll and a second roll situated after the first roll.

The conventional process will now be explained by way of illustration.

According to the invention, the spinning temperature for melt spinning of the starting material is appropriately in the range of 240–320° C., preferably 240–300° C., and more preferably 240–280° C. If the spinning temperature is below 240° C., the temperature will be too low enough to produce a stabilized molten state, and increase unevenness in the obtained fibers, and prevent satisfactory tenacity and elongation from being exhibited. If the spinning temperature is above 320° C., the thermal decomposition becomes more severe, so that the resulting yarn will be discolored and satisfactory tenacity and elongation will not be exhibited.

The winding speed for the yarn is not particularly restricted, but winding is normally accomplished at no greater than 3500 m/min, preferably no greater than 2500 m/minute, and more preferably no greater than 2000 m/min. If the winding speed is over 3500 m/min, crystallization of the fibers will progress too much prior to the winding which will make it impossible to increase the draw ratio during the drawing step, thus preventing orientation of the molecules, and fibers with sufficient yarn tenacity and elastic recovery will not be obtainable so that winding interference will be produced, causing the bobbin, etc. to be unremovable from the winding machine. The draw ratio for drawing may be 2–4, preferably 2.2–3.7 and more preferably 2.2–3.1. By combining the draw processing with subsequent heat treatment in this manner, it is possible to give fibers with a birefringence of 0.03 or greater. With a draw ratio of only up to 2, it is not possible to sufficiently orient the polymer by the drawing, and the resulting fibers will have low elastic recovery. With a draw ratio of greater than 4, the yarn breakage becomes severe and stable drawing cannot be accomplished.

The temperature for drawing is suitably 30–80° C., preferably 35–70° C. and more preferably 40–65° C. in the drawing zone. When the temperature in the drawing zone is below 30° C., more yarn breakage occurs during the drawing, so that continuous fibers cannot be obtained. At above 80° C. the sliding property of the fibers is impaired in the heated zone, including the drawing roll, so that monofilament breakage is increased and the yarn becomes full of fluff. The polymer also slips against itself so that the fibers do not undergo sufficient orientation and the elastic recovery of the fibers is reduced.

In order to avoid changes in the fiber structure over time, it is necessary to carry out heat treatment after the drawing. The heat treatment is suitably 90–200° C., preferably 100–190° C. and more preferably 110–180° C. If the heat temperature is below 90° C. the fibers do not undergo sufficient crystallization, and the elastic recovery of the fibers is reduced. With a high drawing temperature of over 200° C. the fibers become cut in the heat treatment zone, making drawing impossible.

The spin-draw process will now be explained by way of illustration.

After running the melted multifilaments which have been extruded from the spinneret through a 2–80 cm-long warming zone held at an atmospheric temperature of 30–200° C. and provided directly under the spinneret to prevent drastic cooling, the melted multifilaments are rapidly cooled for conversion to solid multifilaments, wound around a first roll heated to 40–70° C. at a rate of 300–3000 m/min, and are not wound up but are subsequently wound around a second roll heated to 120–160° C. with drawing to a factor of 1.5–3 between the first roll and the second roll which rotates at a faster speed than the first roll, after which they are wound up using a winding machine running at a lower speed than the second roll. If necessary, interlace treatment may be carried out during the spinning process. Undrawn yarn that has been first wound up at a spinning speed of 300–3000 m/min may also be passed around this first roll and second roll and then wound up.

In the spin-draw process, it is much preferred for the melt extrusion of the polymer to be carried out in the same manner as in the conventional process, with the melted multifilaments which have been extruded from the spinneret being not rapidly cooled at once but instead passed through a 2–80 cm-long warming zone held at an atmosphere temperature of 30–200° C. and provided directly under the spinneret to prevent drastic cooling, and the melted multifilaments are then rapidly cooled for conversion to solid multifilaments and supplied to the subsequent drawing step. By passing through this warming zone, it is possible to inhibit fine crystallization of the polymer in the fibers by rapid cooling and production of ultra-oriented amorphous portions, and form an amorphous structure which is easily drawn in the drawing step, to thereby obtain the necessary fiber properties for the invention. Since poly(trimethylene terephthalate) has a much faster crystallization rate than other polyesters such as poly(ethylene terephthalate), for example, this gradual cooling is a very effective method of inhibiting formation of fine crystals and ultra-oriented amorphous portions. Rapid cooling occurs when the atmosphere temperature directly under the spinneret is below 30° C., and this makes it difficult to increase the draw ratio and tends to result in yarn breakage at 200° C. and above. The temperature of the warming zone is therefore preferably 40–200° C., and more preferably 50–150° C. The length of the warming zone is 5–30 cm.

The spinning speed for the yarn is 300–4000 m/min for winding around the first roll. If the spinning speed is under 300 m/min, the spinning stability will be superior but productivity will be greatly reduced. If it exceeds 4000 m/min, orientation of the amorphous portions and partial crystallization will be accelerated prior to winding and it will not be possible to increase the draw ratio of the fibers in the drawing step, so that orientation of the molecules will not be achievable and it will be difficult for the fibers to exhibit sufficient yarn tenacity. The spinning speed is preferably 1500–2700 m/min.

The winding machine speed must be lower than that of the second roll in order to cause relaxed orientation of the amorphous portions of the fibers, and this results in weakening of the large contraction in the poly(trimethylene terephthalate) fibers as well as a slight improvement in the dyeability as the amorphous portions become looser to form a structure into which the dye can enter more easily. The relax ratio (winding speed/second roll speed) is about 0.95–0.99, and preferably 0.95–0.98.

The second roll speed is determined by the draw ratio, and is normally 600–6000 m/min. The draw ratio between the first roll and the second roll is 1.3–3 times, and preferably 2–2.7 times. By combining the drawing treatment and the subsequent heat treatment in this manner, it is possible to increase the birefringence of the fibers to 0.03 or greater. With a draw ratio of only up to 1.3 it is not possible to sufficiently orient the polymer by the drawing, and the resulting fibers will have low tenacity and elastic recovery. With a draw ratio of greater than 3, the fluff formation becomes frequent and stable drawing cannot be accomplished. The first roll temperature is 40–70° C., since it is easy to create a condition suitable for drawing in this range. The first roll temperature is preferably 50–60° C. Heat setting is accomplished with the second roll, and this roll temperature is 120–160° C. The heat stability will be lacking if the second roll temperature is below 120° C., resulting in fibers that are susceptible to heat deformation and change with time, and also lowering the dyeing discoloration. If the second roll temperature is above 160° C., fluff and yarn breakage will occur making it impossible to achieve stable spinning. The second roll temperature is preferably 120–150° C.

The polyester fibers obtained in this manner may be used alone or as part of a fabric to give the fabric excellent softness, stretch properties and dye colorability. There are no particular restrictions on other fibers also used as a part of the fabric, and especially when used in combination with fibers such as stretch fibers such as polyurethane elastic fibers, or cellulose fibers, wool, silk, acetate fibers, etc. it is possible to exhibit characteristics such as a soft touch and stretch properties that cannot be achieved with composite fabrics employing known synthetic fibers or chemical fibers.

According to the invention, a fabric includes a woven fabric and a knitted fabric. The fabrics of the invention include the aforementioned composite fabrics, with no particular restrictions on the form of the polyester fibers used or on the weaving and knitting method, for which any known method may be used. For example, plain woven fabrics used for warps yarns or weft yarns, reversible woven fabrics, knitted fabrics such as tricots and raschel fabrics, etc. may be mentioned, and doubled yarn, plaited yarn or interlacing may be employed.

The fabrics of the invention include composite fabrics may be dyed after weaving, for example, by a process comprising scouring, presetting, dyeing and final setting by a common method. If necessary, the scouring may be followed by a conventional caustic reduction treatment prior to dyeing.

The scouring may be carried out in a temperature range of 40–98° C. In the case of a composite with stretch fibers, in particular, scouring while relaxing the fibers is preferred for improved elasticity.

Heat setting either before and/or after dyeing may be omitted, but both are preferably carried out for improved form stability and dyeability of the fabric. The temperature for heat setting is 120–210° C. and preferably 140–180° C., and the heat setting time is 10 seconds to 5 minutes, and preferably 20 seconds to 3 minutes.

The dyeing may be carried out without using a carrier, at a temperature of 70–150° C., preferably 90–120° C. and more preferably 90–100° C. For uniform dyeing, it is especially preferred to use acetic acid, sodium hydroxide, etc. to adjust the pH to suit the dye, while also using a dispersing agent consisting of a surfactant.

After dyeing, known methods are applied for soaping or reduction cleaning of the dyed fabric. The methods may be conventional methods, for example, a treatment using a reducing agent such as sodium hydrosulfite in an alkali solution of sodium carbonate or sodium hydroxide.

BEST MODE FOR CARRYING OUT THE INVENTION

The present invention will now be explained in further detail with reference to the examples, with the understanding that the invention is in no way limited merely to these examples. The major values given in the examples were measured by the following methods.

(1) Measurement of intrinsic viscosity of starting materials and fibers

The intrinsic viscosity [η] was determined according to the following equation, using a Ostwald viscosity tube, and using o-chlorophenol at 35° C., with the ratio ηsp/C between the specific viscosity ηsp and the concentration C (g/100 milliliters) extrapolated to zero concentration.

[η]=lim(ηsp/C)
C→0

(2) Measurement of amount of elemental phosphorus and elemental cobalt in the starting materials and fibers, amount of metal element used as polycondensation reaction, and X value The amount of elemental phosphorus and elemental cobalt and the amount of metal element such as titanium, etc. used as the polycondensation catalyst was measured using a high-frequency plasma emission spectroscope (model: IRIS-AP, Thermo Jarrell Ash). The analysis sample was prepared in the following manner. A 0.5 g sample and 15 milliliters of concentrated sulfuric acid were added to an Erlenmeyer flask, and dissolved for 3 hours on a hot plate at 150° C. and for 2 hours on a hot plate at 350° C. After cooling, 5 milliliters of hydrogen peroxide was added for oxidative decomposition, after which the solution was concentrated to 5 milliliters, 5 milliliters of an aqueous solution of concentrated hydrochloric acid/water (1:1) was added and 40 milliliters of water was further added to prepare the analysis sample. The X value represents the proportion of the number of moles of elemental phosphorus in the phosphorus compound with respect to the number of moles of the metal element used as the polycondensation catalyst (=no. of moles of elemental phosphorus in phosphorus compound/no. of moles of metal element used as polycondensation catalyst).

(3) Measurement of discoloration (yellowness) of starting materials and fibers

In the case of refined starting materials or fibers, a single end fed knitted fabric (28G, plain stitch) in a stack of 6 was used, and a color computer (Suga Test Equipment) was used for color measurement. The b value represents the yellowness and blueness, with increasing yellowness as the value increases from zero. Conversely, the blueness increases as the value decreases from zero. A value nearer zero indicates less color.

(4) Measurement of melting point of starting materials and fibers

A DSC by Seiko Electronics was used for measurement under a 100 milliliter/min nitrogen stream at a temperature elevating rate of 20° C./min. Here, the peak value of the fusion peak was defined as the melting point.

(5) Measurement of cyclic dimers in starting materials and fibers

A 0.3 g portion of the resin composition or fibers was measured out and added to a mixture of 5 milliliters of hexafluoroisopropanol and 5 milliliters of chloroform for dissolution at room temperature. After complete dissolution, 5 milliliters of chloroform was added and approximately 80 milliliters of acetonitrile was further added. This caused precipitate of insolubles which were then filtered out, and the total filtrate was transferred to a 300 milliliter flask and acetonitrile was added to obtain a clear solution with a total volume of 200 milliliters.

The solution was analyzed by high-performance liquid chromatography to measure the amount of cyclic dimers. The column used was a μ Bondasphere 15μ C-18-100A, 3.9×190 mm (Waters Co.), water/acetonitrile (volume ratio: 30/70) was used as the mobile phase, and ultraviolet rays with a wavelength of 242 nm were used for detection. The temperature was 45° C., and the flow rate was 1.5 milliliters/min.

(6) Measure of BPE quantity in starting materials and fibers

A 2 g portion of the refined starting material or fibers was added to 25 milliliters of a methanol solution containing 2 N potassium hydroxide, solvolysis was carried out for 4 hours under reflux, and the methanol solution was used for quantitation by gas chromatography. The column used was DURABOND DB-WA×0.25 mm×30 m (0.25 μm), and the measurement was with temperature elevation from 150 to 230° C. at rate of 20° C./min while blowing in helium at 100 milliliters/min.

(7) Spinning method and fluff rate measurement

After drying, the starting material was melted at an extrusion temperature of 270° C., passed through a spinneret nozzle (36 holes, 0.23 mm), melt spun at a spinning speed of 1500 m/min, and wound up as undrawn yarn. The undrawn yarn was then passed through a hot roll at 55° C. and a hot plate at 140° C., and drawn to 2.4 times. The denier and number of filaments of the resulting fibers were set to 50 d/36 f. The fluff rate was measured by taking 1000 filaments of 500 g yarn, counting the fibers with fluff appearing on the surface, dividing that number by 1000 and then multiplying by 100 to determine the fluff rate.

(8) Measurement of melt viscosity retention of starting materials

The intrinsic viscosity of undrawn yarn obtained by the method of (7) was divided by the intrinsic viscosity of the starting material used, and this was multiplied by 100 to determine the melt viscosity retention.

(9) Measurement of mechanical properties of fibers (tenacity, elongation, elastic modulus)

The mechanical properties of the fibers were measured according to JIS-L-1013.

(10) Measurement of elastic recovery

The fibers were mounted in a tensile tester with a chuck spacing of 20 cm, and left for one minute with elongation at a tensile rate of 20 cm/min to 20% elongation. It was then contracted at the same rate, and a stress-strain curve was drawn. The residual elongation (A) was defined as the elongation during contraction when the stress reached zero. The elastic recovery was then calculated according to the following equation.

Elastic recovery=(20-A)/20≦100(%)

(11) Measurement of birefringence

An optical microscope and compensator were used for calculation from the retardation observed on the fiber surface (Fiber Handbook: Raw Material edition, p.969, 5th printing, 1978, Maruzen, K K.).

EXAMPLE 1

A 7:1 mixture of calcium acetate and cobalt acetate tetrahydrate was added to 25,000 parts by weight of dimethyl terephthalate (hereunder abbreviated to DMT) and 21,553 parts by weight of trimethylene glycol at 0.1wt %/DMT (where the units indicate the weight ratio with respect to DMT), and ester exchange was conducted for 4 hours at atmospheric pressure and at a heater temperature of 240° C. Next, titanium tetrabutoxide was added at 0.1 wt %/DMT and trimethyl phosphate at 0.05 wt %/DMT, for polycondensation at 270° C., 0.2 Torr for 3 hours. The resulting resin composition was a resin composition containing 97% by weight of poly(trimethylene terephthalate). The properties of the resin composition are shown in Table 1, and the properties of the obtained fibers are shown in Table 2. The fibers obtained by melt spinning this resin composition had excellent whiteness, a low fluff rate and low viscosity reduction in the spinning stage.

EXAMPLES 2 AND 3

Example 1 was repeated with different amounts of cobalt acetate and trimethyl phosphate. The resulting resin composition was a resin composition containing 97% by weight of poly(trimethylene terephthalate). The properties of the resin composition are shown in Table 1, and the properties of the obtained fibers are shown in Table 2.

The fibers obtained using this resin composition had excellent whiteness, a low fluff rate and low viscosity reduction in the spinning stage.

EXAMPLE 4

A 7:1 mixture of calcium acetate and cobalt acetate tetrahydrate was added as an ester exchange catalyst to 0.1% by weight of the theoretical amount polymer, and the experiment was conducted in the same manner as Example 1 with a polymerization temperature of 250° C. and a polymerization time of 2 hours. The resulting resin composition was a resin composition containing 97% by weight of poly(trimethylene terephthalate). The properties of the resin composition are shown in Table 1, and the properties of the obtained fibers are shown in Table 2.

Melt spinning of this resin composition gave a yarn with excellent whiteness and a low fluff rate. The viscosity reduction in the spinning stage was also low.

EXAMPLE 5

A slurry containing 1300 parts by weight of terephthalic acid (hereunder abbreviated to TPA), 1369 parts by weight of trimethylene glycol and 0.01% by weight of cobalt acetate with respect to TPA was subjected to ester exchange reaction under atmospheric pressure at a heater temperature of 240° C. Next, titanium tetrabutoxide was added at 0.1 wt %/TPA and trimethyl phosphate at 0.05 wt %/TPA, for polycondensation at 270° C., 0.2 Torr for 3 hours. The resulting resin composition was a resin composition containing 97% by weight of poly(trimethylene terephthalate).

The properties of the resin composition are shown in Table 1, and the properties of the obtained fibers are shown in Table 2.

Melt spinning of this resin composition gave fibers with excellent whiteness, and concerning the spinning stability, the fluff rate was low and the viscosity reduction in the spinning stage was low.

EXAMPLE 6

Example 5 was repeated with cobalt carbonate instead of cobalt acetate tetrahydrate and tributyl phosphate instead of trimethyl phosphate, at different amounts. The resulting resin composition was a resin composition containing 97% by weight of poly(trimethylene terephthalate). The properties of the resin composition are shown in Table 1, and the properties of the obtained fibers are shown in Table 2.

The fibers obtained by spinning this resin composition had excellent whiteness, a low fluff rate and low viscosity reduction in the spinning stage.

EXAMPLE 7

Example 5 was repeated with tributyl phosphite instead of trimethyl phosphate, and using no cobalt acetate. The resulting polymer was a resin composition containing 97% by weight of poly(trimethylene terephthalate).

The properties of the resin composition are shown in Table 1, and the properties of the obtained fibers are shown in Table 2.

The fibers obtained by using this resin composition had excellent whiteness, a low fluff rate and low viscosity reduction in the spinning stage.

EXAMPLE 8

The resin composition of Example 1 was subjected to solid state polymerization under a nitrogen stream at 215° C. for 5 hours. The resulting resin composition was a resin composition containing 97% by weight of poly(trimethylene terephthalate), and the cyclic dimer content was drastically reduced at 0.9%. The fiber tenacity was also increased, reflecting the higher viscosity.

REFERENCE EXAMPLE 1

The single end fed knitted fabric (28G, plain stitch) obtained in Example 1 was heat set at 180° C. for 30 seconds, after which 4% owf Dianics Black HG-FS (disperse dye by Dystar, Japan) was used for dyeing at 98° C. for an hour with a liquor to goods ratio of 1:30, in the presence of 1 g/liter of Disper TL (Meisei Chemicals Works Ltd.) at pH 5.

The dye exhaustion was 53%, and color fastness to light of the dyed product which had been exposed in a fade-o-meter at 63° C. for 27 hours revealed no color fading. In contrast, when the same experiment was conducted using the fibers obtained in Example 6, the dye exhaustion was 84% and no color fading was found in the light fastness test.

COMPARATIVE EXAMPLE 1

Example 1 was repeated using 0.1% by weight/DMT of titanium tetrabutoxide as an ester exchange catalyst, and without using trimethyl phosphate and cobalt acetate. The resulting resin composition was a resin composition containing 97% by weight of poly(trimethylene terephthalate), but the discoloration was extensive, and the low melt stability made it possible to obtain only low tenacity yarn.

COMPARATIVE EXAMPLE 2

Example 1 was repeated with the polycondensation temperature lowered to 250° C. and without using trimethyl phosphite and cobalt acetate. The resulting resin composition was a resin composition containing 95% by weight of poly(trimethylene terephthalate), but the discoloration was extensive. The low melt stability also made it possible to obtain only low tenacity yarn. Furthermore, because of a cyclic dimer content of over 3% by weight, the fluff rate was higher.

COMPARATIVE EXAMPLE 3

The resin composition obtained in Comparative Example 1 was subjected to solid state polymerization under a nitrogen stream at 215° C. for 5 hours, to obtain a resin composition with a limiting viscosity of 1.1. The resulting resin composition was a resin composition containing 97% by weight of poly(trimethylene terephthalate).

When this resin composition was used for spinning, the viscosity retention fell to 64%, and poor mechanical properties of 3.5 g/d tenacity and 35% elongation were exhibited.

COMPARATIVE EXAMPLE 4

An experiment was conducted according to Example 1, but with the trimethylene glycol amount increased 8-fold. The BPE content of the resulting resin composition was 2.1% by weight. The resin composition was a resin composition containing 96% by weight of poly(trimethylene terephthalate).

When this resin composition was used to make fibers which were then dyed in the same manner as Reference Example 1 and then subjected to a light fastness test with a fade-o-meter, color fading was found in the dyed product. In contrast, no fading was found in the dyed fibers of Example 1.

COMPARATIVE EXAMPLE 5

A slurry containing 1300 parts by weight of TPA, 1369 parts by weight of trimethylene glycol and 0.01% by weight of cobalt acetate with respect to TPA was subjected to ester exchange reaction under normal pressure at a heater temperature of 240° C. Next, butyltin acid was added at 1 wt %/TPA and tridecyl phosphite at 0.05 wt %/TPA, for polycondensation at 270° C., 0.2 Torr for 3 hours. The b value of the resulting resin composition was 14 and yellow discoloration occurred, while the cyclic dimer content was 3.4% by weight. The resin composition was a resin composition containing 96% by weight of poly(trimethylene terephthalate).

Fibers obtained using this resin composition exhibited yellowing, and the large cyclic dimer content resulted in a high fluff rate of 0.9.

EXAMPLE 9

The procedure of Example 6 was repeated, except that after completion of the ester exchange reaction there was added pentaerythritol-tetrakis[3-(3,5-di-tert-butyl-4-hydroxyphenyl)propionate] (Irganox 1010, product of Ciba Specialty Chemicals K.K.) at 0.07 wt %/TPA. The resin composition was a resin composition containing 96% by weight of poly(trimethylene terephthalate). The viscosity retention of the polymer was improved to 98%. The resin composition was cut into a 3-mm square and heated in air at 130° C. for 6 hours, and the acrolein and allyl alcohol produced were supplemented with a dry ice-methanol bath. The yields of acrolein and allyl alcohol were 0.15 mg and 0.20 mg, respectively, per 1 g of resin composition per hour. In contrast, the yields of acrolein and allyl alcohol with the resin composition of Example 1 were 0.51 mg and 0.82 mg, respectively.

EXAMPLE 10

Fibers obtained in Example 1 were cut to 39 mm. Filaments yarn of 20 d/2 f obtained in the same manner as Example 2 were used as a core to obtain a composite yarn with a filament mixing ratio of 11% by weight where the short fibers were arranged into a sheath. The composite yarns were used as warp yarn (weave density: 146/25.4 mm) and weft yarn (weave density: 77/25.4 mm) to make a plain weave fabric, and dyeing was accomplished at 95° C. by the same dyeing method as in Reference Example 1.

The resulting fabric was dyed in deep shade, and it exhibited excellent coloring properties. The fabric was also soft with light stretch properties, and excellent tension, firmness and resilience.

EXAMPLE 11

Polyester fibers at 75 d/36 f obtained in the same manner as Example 1 were used as warp yarn and weft yarn to make a plain weave fabric. The plain weave fabric was scoured by a conventional method and then preset at 180° C. for 30 seconds, after which it was dyed using a disperse dye without a carrier. The disperse dye used was 5% owf Kayaron Polyester Blue 3RSF (product of Nihon Kayaku Co., Ltd.), and the dispersing agent was Disper TL (product of Meisei Chemicals Works Ltd.) at 1 g/liter, and the pH was adjusted to 5 for the dyeing. The dyeing was carried out at 110° C. for one hour, with a liquor to goods ratio of 1:50. After dyeing, soaping was accomplished at 80° C. for 10 minutes with 1 g/liter of Granup P (non-ionic surfactant, product of Sanyo Chemical Industries Ltd.) and a liquor to goods ratio of 1:50. Finishing was carried out by a conventional method after the dyeing.

The resulting dyed product was uniformly dyed and the dyed fabric had a satisfactory soft touch not obtainable by the prior art.

EXAMPLE 12

The polyester fibers of Example 1 and a 210-denier polyurethane-based stretch fiber Loica (product of Asahi Chemical Industries Co., Ltd.) were used to knit a plain warp knitted fabric at 28G. The loop length of the warp knitted fabric was 1080 mm/480 courses for the polyester fibers and 112 mm/480 courses for the stretch fibers, the thread count density was 90 courses/25.4, and the polyester fiber mixing ratio was 75.5%.

The resulting grey fabric was relax scoured at 90° C. for 2 minutes, and then heat set at 160° C. for one minute. The pH was adjusted to 6 with acetic acid in the presence of Dianics Black BG-FS (disperse dye available from Dystar, Japan) at 8% owf and the dyeing aid Nikkasansort 1200 at 0.5 g/liter, for dyeing at 95° C. for 60 minutes with a liquor to goods ratio of 1:30.

The resulting dyed warp knitted fabric had a soft stretchable feel, excellent discoloration and exhibited tension and firmness.

COMPARATIVE EXAMPLE 6

The resin composition obtained in Example 1 was melt-extruded through a 0.23 mm spinneret nozzle with 36 orifices at 270° C., and was directly wound up at 1600 m/min. It was then heat treated at 40° C. to obtain 75 d/36 f fibers. The birefringence of the resulting fibers was 0.024. The fibers were wound up to 5 kg, and after storage in a warehouse and the yarn exhibited contraction with time. When a sigle end fed knitted fabric (28G, plain stitch) prepared from the yarn was dyed, occurrences of uneven dyeing were observed at severely contracted portions of the dyed fabric.

EXAMPLE 13

The resin composition obtained in Example 1 was used for extrusion from a 0.23 mm spinneret nozzle with 36 orifices at 270° C., and was wound up at 3500 m/min. The birefringence of the resulting 50 d/36 f fibers (POY) was 0.058. The fibers exhibited no change with time even when stored in a warehouse. The fibers were drawn to 1.4 times while heating at 160° C., and then false twisted at 3500 T/min under normal draw-false twisting conditions. The obtained false twisted yarn had excellent stretch and bulky properties.

COMPARATIVE EXAMPLE 7

The procedure of Example 1 was repeated using 0.05% by weight of tris(2,4-di-t-butylphenyl) phosphite instead of 0.05% by weight of trimethyl phosphate.

The resulting resin composition had a intrinsic viscosity of 0.74 and contained 96% by weight of poly(trimethylene terephthalate), and the elemental phosphorus content was 5 ppm, the cyclic dimer content was 3.1% by weight and the BPE content was 0.07% by weight.

When the resin composition was used for spinning, the resultant fiber exhibited a viscosity retention of 84%, a tenacity of 3.8 g/d and an elongation of 33%. The elemental phosphorus content of the fibers was 4 ppm, the cyclic dimer content was 3.2% by weight and the BPE content was 0.09% by weight.

TABLE 1

Compositions and properties of starting materials (polyester resin compositions)

| | Amount of Poly(trimethylene terephthalate) wt % | Elemental phosphorus content ppm | Elemental cobalt content ppm | X value | Intrinsic viscosity dl/g | b value | Melting point ° C. | Cyclic dimer content wt % | BPE content wt % |
|---|---|---|---|---|---|---|---|---|---|
| Example | | | | | | | | | |
| 1 | 97 | 105 | 27 | 1.2 | 0.70 | −2 | 233 | 2.4 | 0.07 |
| 2 | 97 | 105 | 0 | 0.7 | 0.70 | 6.2 | 233 | 1.7 | 0.07 |
| 3 | 97 | 51 | 0 | 0.51 | 0.71 | 7.1 | 232 | 2.2 | 0.06 |
| 4 | 97 | 111 | 27 | 1.2 | 0.62 | 0.7 | 232 | 2.1 | 0.06 |
| 5 | 97 | 89 | 19 | 1.2 | 0.79 | 4.2 | 230 | 2.1 | 0.68 |
| 6 | 97 | 62 | 100 | 2.1 | 0.78 | 1.0 | 230 | 2.2 | 0.76 |
| 7 | 97 | 100 | 0 | 1.88 | 0.68 | 4.2 | 230 | 2.1 | 0.66 |
| 8 | 98 | 105 | 30 | 1.2 | 1.10 | 0.1 | 232 | 0.9 | 0.68 |
| 9 | 97 | 61 | 95 | 2.1 | 0.80 | 1.0 | 230 | 2.4 | 0.80 |
| Comp. Ex. | | | | | | | | | |
| 1 | 97 | 0 | 0 | 0 | 0.71 | 12.2 | 232 | 2.4 | 0.08 |
| 2 | 95 | 0 | 0 | 0 | 0.71 | 13.2 | 232 | 3.6 | 0.08 |

TABLE 2

Characteristics of Polyester Fibers

| | Amount of poly(tri-methylene terephthalate) wt % | Elemental phosphorus content ppm | Elemental cobalt content ppm | X value | Intrinsic viscosity dl/g | b value | Melting point ° C. | Cyclic dimer content wt % |
|---|---|---|---|---|---|---|---|---|
| Example | | | | | | | | |
| 1 | 97 | 100 | 27 | 1.2 | 0.69 | −1.5 | 235 | 2.8 |
| 2 | 97 | 103 | 0 | 0.7 | 0.68 | 5.8 | 235 | 2.9 |
| 3 | 97 | 55 | 0 | 0.51 | 0.68 | 7.2 | 234 | 2.6 |
| 4 | 97 | 113 | 27 | 1.2 | 0.60 | 0.9 | 235 | 2.7 |
| 5 | 97 | 85 | 18 | 1.2 | 0.77 | 4.6 | 232 | 2.6 |
| 6 | 97 | 62 | 100 | 2.1 | 0.75 | 1.1 | 232 | 2.9 |
| 7 | 97 | 98 | 0 | 1.88 | 0.67 | 4.2 | 234 | 2.7 |
| 8 | 98 | 105 | 32 | 1.2 | 1.01 | 0.6 | 235 | 1.2 |
| 9 | 97 | 59 | 95 | 1.2 | 0.78 | 1.2 | 235 | 2.9 |
| Comp. Ex. | | | | | | | | |
| 1 | 97 | 0 | 0 | 0 | 0.60 | 14.8 | 232 | 2.9 |
| 2 | 95 | 0 | 0 | 0 | 0.62 | 14.1 | 232 | 4.4 |

| BPE content wt % | Bire-fringence | Tenacity g/d | Elongation % | Elastic modulus g/d | Elastic recovery % | Viscosity retention % | Fluff rate % |
|---|---|---|---|---|---|---|---|

TABLE 2-continued

Characteristics of Polyester Fibers

| Example | | | | | | | | |
|---|---|---|---|---|---|---|---|---|
| 1 | 0.09 | 0.075 | 4.6 | 35 | 23 | 90 | 98 | 0.2 |
| 2 | 0.06 | 0.074 | 4.6 | 32 | 25 | 90 | 97 | 0.2 |
| 3 | 0.08 | 0.073 | 4.5 | 36 | 23 | 88 | 96 | 0.2 |
| 4 | 0.07 | 0.071 | 4.7 | 32 | 25 | 89 | 97 | 0.4 |
| 5 | 0.72 | 0.065 | 4.6 | 35 | 23 | 88 | 98 | 0.2 |
| 6 | 0.79 | 0.064 | 4.4 | 31 | 25 | 87 | 96 | 0.3 |
| 7 | 0.80 | 0.063 | 4.6 | 32 | 26 | 89 | 98 | 0.2 |
| 8 | 0.75 | 0.071 | 5.1 | 33 | 26 | 88 | 92 | 0.1 |
| 9 | 0.88 | 0.070 | 4.3 | 34 | 25 | 89 | 98 | 0.2 |
| Comp. Ex. | | | | | | | | |
| 1 | 0.10 | 0.065 | 3.9 | 33 | 25 | 90 | 85 | 0.2 |
| 2 | 0.12 | 0.068 | 3.8 | 35 | 25 | 90 | 87 | 1.1 |

INDUSTRIAL APPLICABILITY

The polyester fibers of the invention are polyester fibers with excellent whiteness and tenacity, comprising a poly(trimethylene terephthalate) resin composition with excellent whiteness, spinning stability and melt stability; they allow advantageous industrial production by melt spinning of a poly(trimethylene terephthalate) resin composition with high melt stability and low polymerization degree reduction during the spinning stage.

The poly(trimethylene terephthalate) fibers of the invention have satisfactory processability and can therefore be used to manufacture knitted and woven fabrics provided with functions that cannot be obtained with conventional polyester and nylon fibers, for such applications as clothing products represented by inner wear, outer wear, sportswear, swimsuits, panty stockings, linings and the like as well as material products such as carpets, core fabrics, flock, etc.

What is claimed is:

1. Polyester fibers with a limiting viscosity of 0.4–2 that satisfy the following conditions (1) to (5).
   (1) being composed of at least 90% by weight of poly(trimethylene terephthalate),
   (2) containing a phosphorus compound at 10–250 ppm in terms of weight of elemental phosphorus,
   (3) containing no more than 3 wt % of cyclic dimers,
   (4) containing no more than 2 wt % of bis(3-hydroxypropyl) ether and copolymerized with poly(trimethylene terephthalate), and
   (5) having a birefringence of 0.03 or greater.

2. Polyester fibers according to claim 1, characterized in that the proportion of the number of moles of the elemental phosphorus in the phosphorus compound with respect to the number of moles of the metal element used as the polycondensation catalyst is 0.4–3.

3. Polyester fibers according to claim 1 or 2, characterized in that the phosphorus compound is a phosphate represented by $O=P(OR_1)(OR_2)(OR_3)$ or a phosphite represented by $P(OR_4)(OR_5)(OR_6)$, where $R_1, R_2, R_3, R_4, R_5$ and $R_6$ may be the same or different, and are selected from among hydrogen atoms or organic groups of 1–8 carbon atoms, alkali metals and alkaline earth metals.

4. Polyester fibers according to any one of claims 1 to 3, characterized by further containing a cobalt compound at 5–200 ppm in terms of weight of elemental cobalt.

5. Polyester fibers according to claim 4, characterized in that the cobalt compound is at least one selected from among cobalt acetate, cobalt formate, cobalt carbonate, cobalt acetylacetonate and cobalt sulfate.

6. Polyester fibers according to any one of claims 1 to 5, characterized in that the copolymerized bis(3-hydroxypropyl)ether is present at 0.4–1% by weight.

7. Polyester fibers according to any one of claims 1 to 6, characterized by containing no more than 1% by weight of a hindered phenol-based antioxidant.

8. Polyester fibers according to any one of claims 1 to 7, characterized in that the limiting viscosity is 0.81–2, and the cyclic dimer content is no more than 2% by weight.

9. A fabric all or part of which employs polyester fibers according to any one of claims 1 to 8.

* * * * *